Feb. 10, 1970     K. F. LINDGREN     3,494,494
FORWARD TILT PROTECTION SYSTEM FOR LIFT TRUCK
Filed Jan. 2, 1968
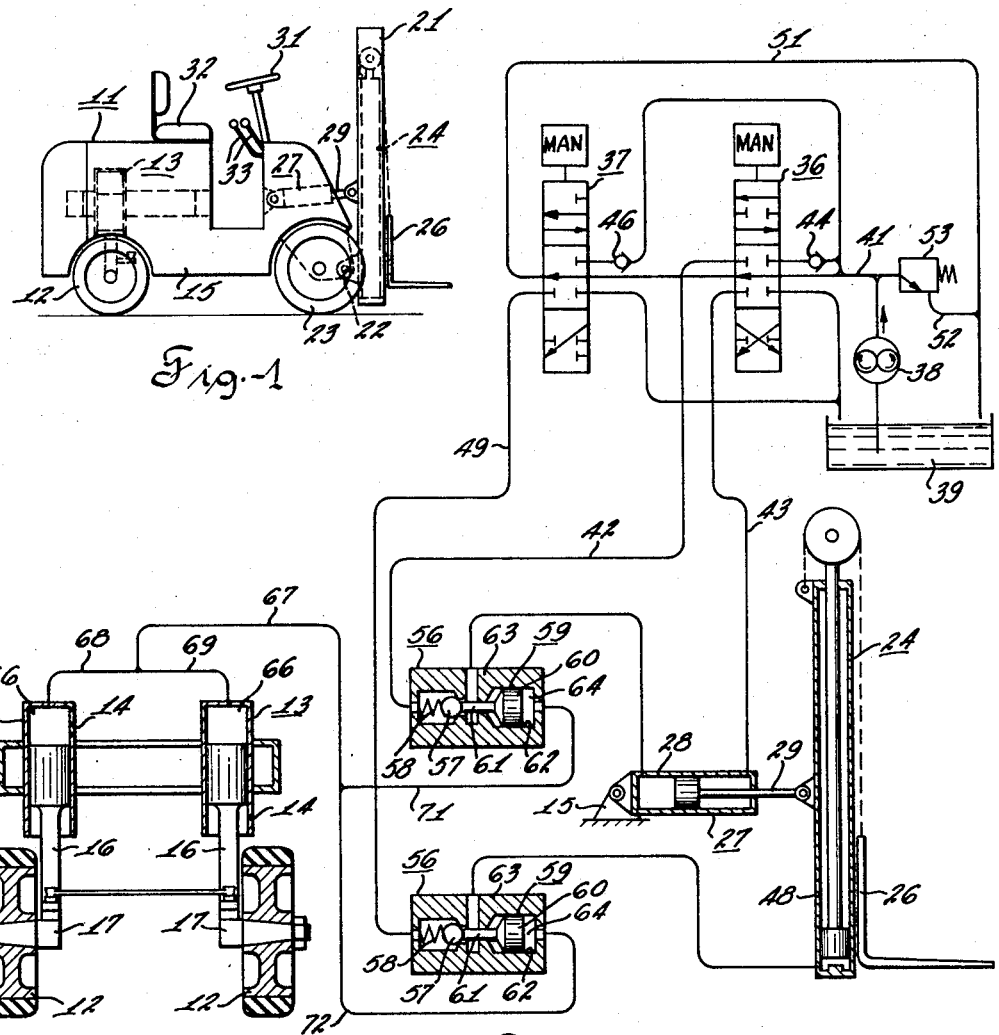
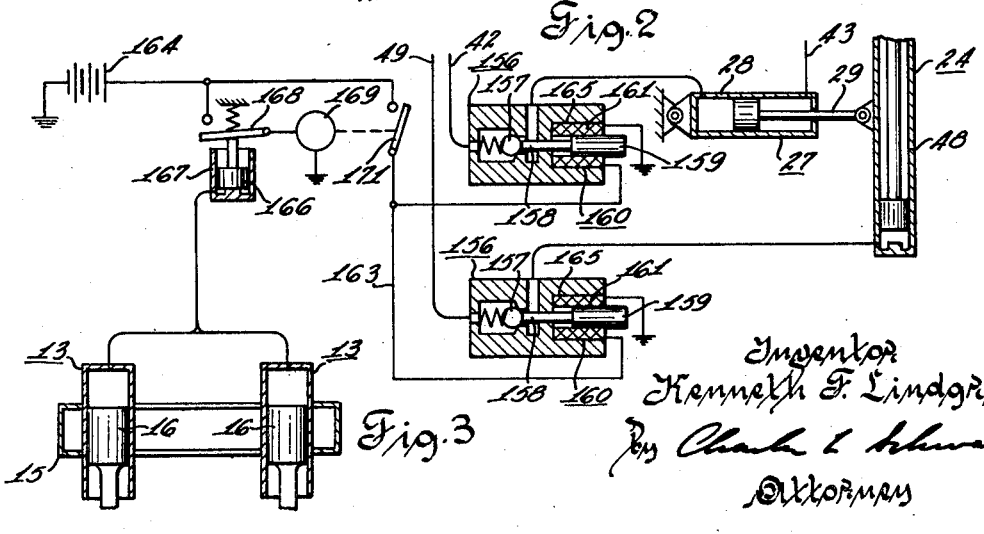

United States Patent Office 3,494,494
Patented Feb. 10, 1970

3,494,494
FORWARD TILT PROTECTION SYSTEM FOR LIFT TRUCK
Kenneth F. Lindgren, Aurora, Ill., assignor to Allis-Chalmers Manufacturing Company, Milwaukee, Wis.
Filed Jan. 2, 1968, Ser. No. 695,126
Int. Cl. B66f 9/06
U.S. Cl. 214—673                              4 Claims

ABSTRACT OF THE DISCLOSURE

A safety system for a lift truck wherein the reduced pressure in the hydraulic suspension for the rear wheels is employed through appropriate control means to prevent forward tilting of the mast and raising of the carriage when the rear wheels are so lightly loaded as to produce an unsafe counterbalanced condition.

---

This invention relates to means for making lift truck operation safer, and particularly to safety means to prevent truck tilt stability from reaching an unsafe condition.

A lift truck may become unstable if it is overloaded or if the truck is operating on inclined ramps or the like. Even though a truck may have a certain rated capacity, various combinations of loadings, lift height, tilt and ramp inclination can cause the truck to be dangerously unstable. Heretofore others have suggested that the relative motion between the truck chassis and a spring suspended rear axle be employed to disable the forward tilt circuit and load lift circuit of the truck. These devices have been found to require frequent adjustment to keep them in working order. Also, these devices have a serious operational handicap. In order for these prior art safety devices to operate, the truck must be sufficiently overloaded or instable to cause a predetermined relative movement between the rear axle and chassis. The upward movement of the rear of the truck increases the forward tilting instability. Thus the lift truck must be substantially unstable before the safety device operates and the forward tilting movement of the truck about its front wheels, which is sensed to operate the safety device, makes the truck increasingly unstable.

It is an object of this invention to provide an improved lift truck safety system which obviates the hereinfore outlined difficulties.

It is a further object of this invention to provide an improved safety system for a lift truck to prevent forward overturning which functions in response to the decrease in load on the rear wheels of the truck.

It is a further object of this invention to provide means to prevent forward tilting of the mast and raising the carriage of a lift truck when the rear wheel loading is reduced below a predetermined value.

It is a further object of this invention to provide a safety system as outlined in the previous objects wherein the operation of the safety device does not rely on relative movement between the rear wheels and truck chassis.

It is a further object of this invention to provide means for preventing forward tilting of the mast and raising the load carriage of a lift truck when the hydraulic pressure in the hydraulic suspension system for the rear wheels of the lift truck falls below a predetermined value.

These and other objects and advantages of this invention will be apparent to those familiar with the art when the following description is read in conjunction with the drawings in which:

FIG. 1 shows a side view of the type of lift truck in which the present invention may be incorporated;

FIG. 2 is a schematic showing of a safety system incorporating one embodiment of the present invention; and FIG. 3 is a schematic illustration of a second embodiment of the present invention.

Referring to the drawings, the lift truck 11 in which the present invention is illustrated includes a pair of steerable rear wheels 12 supporting the rear of the lift truck through hydraulic jacks 13, the cylinders 14 of which are rigidly secured to the chassis 15 and the pistons 16 of which have axle portions 17 at their lower ends rotatably mounting the wheels 12. The present invention may also be used in lift trucks having the hydraulic rear wheel suspension system shown in copending U.S. patent application of Neil J. Ryskamp, Ser. No. 627,121 filed Mar. 30, 1967, now U.S. Patent No. 3,439,927. An upright mast 21 is pivotally connected on a transverse axis 22 to the forward end of the lift truck 11 adjacent the front drive wheels 23. The mast 21 carries a lift ram 24 which, upon expansion, raises a load carriage 26 reciprocably mounted on the mast. The mast 21 may be adjusted forwardly and rearwardly about the pivot axis 22 by expansion and contraction of a double acting tilt ram 27 having its cylinder 28 pivotally connected to the lift truck chassis 15 and its rod 29 pivotally connected to the mast 21. The lift truck 11 is provided with the usual steering wheel 31 at the operator's station 32 and appropriate control levers 33 for operating the tilt ram control valve 36 and lift ram control valve 37.

As shown in FIG. 2 the hydraulic system for the lift and tilt rams 24, 27 includes a hydraulic pump 38 having its input connected to reservoir 39 and its output connected to the open center control valves 36, 37 through a main supply conduit 41. The control valve 36 for a tilt ram 27 is connected to the latter through a pair of tilt ram conduits 42, 43. The bottom end of the lift ram cylinder 48 is connected to lift ram valve 37 through a lift ram supply conduit 49. The valves 36, 37 place the tilt ram 27 and lift ram 24 in fluid receiving relation to the pump 38 through load check valves 44, 46.

In the illustrated hold position of the open center valves, pump output flows through the control valves by way of return to reservoir passage 51. An appropriate bypass 52 with relief valve 53 is provided for the pump 38.

A lift truck during operation may be subject to conditions in which the forward overturning stability of the truck is so seriously impaired that it is in danger of turning over a forward direction. For instance, if an exceptionally heavy load is carried, the rear wheels to the truck may actually be raised off the flooring in which case a very dangerous situation is created in that the truck is no longer maneuverable because of lack of steering control and the truck may actually trun over if the load is elevated to a substantial height. Also, when maneuvering the truck down an inclined ramp, the load may be sufficiently heavy to excessively lighten the load on the rear steering wheels. When the lift truck loading approaches an unstable condition it becomes important from a safety standpoint to prevent accidental or intentional forward tilting of the mast or raising of the carriage. In order to prevent forward tilting of the mast 24, and raising the load carriage 26 when the truck approaches an unstable condition, locking valves 56 are provided in tilt ram conduit 42 and lift ram conduit 49. Each of the locking valves 56 include a shiftable valve element in the form of a ball 57 which is biased to its closed position, as illustrated, by a spring 58. In its illustrated closed position, the valve elements 57 of the tilt ram locking valve 56 prevents flow to the tilt rams which would cause the mast to be tilted forwardly, that is, expansion of the ram 27 is prevented. Also, the locking valve 56 for the lift ram in its llustrated closed position prevents pressure fluid from being delivered to the lift ram 24 and thus prevents any further raising of the carriage 26. When a truck reaches an unstable condition, that is, it is in danger of forward overturning about the front wheels 23, further raising of the carriage 26 and payload usually increases the instability although such would depend on whether or not the center of gravity of the payload is shifted forwardly.

It should be noted that the locking valves do not prevent rearward pivotal adjustment of the mast 24 and lowering of the carriage 26 through contraction of the lift ram 24. In other words, in the illustrated position of the locking valves 56, reverse flow of fluid is permitted due to the use of a rather light spring 58 to bias the valve element 57. Each of the locking valves 56 is provided with an actuator 59 having a hydraulic piston 60, which presents a reduced diameter finger portion 61 in abuttable relation with ball 57, is reciprocally positioned in a cylinder 62 formed by the walls of the locking valve body 53. The pressure chamber 64 in the cylinder 62 on the side of the piston 59 remote from its finger 61 is connected to the pressure chambers 66, of the wheel support jacks 13 through a main conduit 67 and branch conduits 68, 69 and 71, 72. When the vehicle is loaded and operating under conditions wherein it is not in danger of forward overturning, there will be sufficient load on the rear wheels 12 to create pressure in the jacks 13 above a predetermined value. When this predetermined value is reached, the pistons 59 of the locking valves will move to the left thereby moving the valve elements 57 off their seat to an open position in which two-way flow may occur in the conduits in which the locking valves 56 are installed.

The operation of the locking valves, that is the closing of the locking valves occurs when the pressure in the chambers 66 of the jacks 13 falls below a predetermined value. Such a reduction of pressure will occur without any substantial amount of movement between the rear steer wheels and the rear of the lift truck since hydraulic fluid is relatively incompressible. Stated differently, the rear of the lift truck need not move upwardly, thus increasing the instability of the truck through forward movement of the mast connected thereto, in order to bring about closing of the locking valves. It will be appreciated that the branch passages 68, 69 are connected to one another and place the chambers 66 of jacks 13 in fluid communication. This provides an equalizer for the rear wheels 12. It will also be noted that the equalizing of pressure in chambers 66 tends to average out the pressure acting on actuators 59.

In FIG. 3 slightly different actuating means for controlling the locking valves 156 are provided. The valve elements 157 of the locking valves are moved to their open position by a finger portion 158 of a solenoid armature 159. The solenoid 165 includes windings 161 which are connected by appropriate circuit means 163 to a suitable battery 164. When the rear wheels of the vehicle are only slightly loaded, these pistons 166 of actuator 167 will be unable to close the biased switch 168 and thus the coil 169 will not be energized to close switch 171 in the circuit means 163. Thus the actuating means 160 includes armature 159 and solenoid 165 and means for automatically operating the electrical actuating means 160 includes an operating circuit 163 for the solenoid 165 having a switch 171 and pressure responsive means for operating the switch including actuator 167 connected to jacks 13, switch 168 and coil 169.

The embodiments of the invention for which an exclusive property or privilege is claimed are defined as follows:

1. In combination with a lift truck having a forwardly and rearwardly tiltable mast, a lift ram, a double acting mast tilt ram, a manually operated control valve for each of said rams, rear wheel means supporting said truck through a hydraulic jack, a pair of tilt ram conduits connecting opposite ends of said tilt ram to the control valve therefor, and a lift ram conduit connecting said lift ram to the control valve therefor, a safety system comprising:
   a first locking valve in one of said tilt ram conduits including a shiftable valve element having an open position permitting two-way flow in said one conduit and a closed position in which flow in said one conduit causing forward tilting of said mast is prevented and reverse flow is permitted,
   a second locking valve in said lift ram conduit including a shiftable valve element having an open position permitting two-way flow in said lift ram conduit and a closed position in which flow causing expansion of said lift ram is prevented and reverse flow causing contraction of said lift ram is permitted,
   hydraulically operated actuating means for each of said locking valves operable to shift said valve elements from their closed position to their open position,
   conduits means connecting said jack with said actuating means, said actuating means being operated by the pressure in said jack when the pressure therein exceeds a predetermined value to place said valve elements in their open positions.
2. The invention of claim 1 wherein said rear wheel means includes a pair of rear wheels each supported by a hydraulic jack and said conduit means includes a hydraulic interconnection between said jacks.
3. The invention of claim 1 wherein said actuating means includes a solenoid, an operating circuit for said solenoid, a switch in said operating circuit and pressure responsive means for operating said switch in response to predetermined pressure conditions of said jack.
4. The invention of claim 3 wherein said rear wheel means includes a pair of rear wheels each supported by a hydraulic jack and said conduit means includes a hydraulic interconnection between said jacks.

References Cited

UNITED STATES PATENTS

| 2,751,994 | 6/1956 | Remde | 214—673 XR |
| 3,184,088 | 5/1965 | Berge | 214—653 |
| 3,356,954 | 12/1967 | Gottschalk | 280—6 |

FOREIGN PATENTS

| 739,863 | 11/1955 | Great Britain. |
| 748,888 | 5/1956 | Great Britain. |
| 856,939 | 12/1960 | Great Britain. |
| 1,139,707 | 11/1962 | Germany. |
| 472,288 | 6/1952 | Italy. |
| 188,551 | 3/1964 | Sweden. |

GERALD M. FORLENZA, Primary Examiner

R. B. JOHNSON, Assistant Examiner